United States Patent
Zhao et al.

(10) Patent No.: US 10,866,605 B2
(45) Date of Patent: Dec. 15, 2020

(54) ULTRA-LOW POWER CONSUMPTION POWER SUPPLY STRUCTURE

(71) Applicants: BEIJING SMARTCHIP MICROELECTRONICS TECHNOLOGY COMPANY LIMITED, Beijing (CN); STATE GRID INFORMATION & TELECOMMUNICATION GROUP CO., LTD., Beijing (CN); State GRID CORPORATION OF CHINA, Beijing (CN)

(72) Inventors: Dongyan Zhao, Beijing (CN); Xiaoke Tang, Beijing (CN); Xiaoman Wang, Beijing (CN); Dejian Li, Beijing (CN); Haifeng Zhang, Beijing (CN); Yi Hu, Beijing (CN); Lixin Yang, Beijing (CN); Yidong Yuan, Beijing (CN); Lang Tan, Beijing (CN); Yongwang Ma, Beijing (CN); Jiali Hou, Beijing (CN)

(73) Assignee: Beijing Smartchip Microelectronics Technology Comp, Beijing (CN)

( * ) Notice: Subject to any disclaimer, the term of this patent is extended or adjusted under 35 U.S.C. 154(b) by 0 days.

(21) Appl. No.: 16/958,789

(22) PCT Filed: May 22, 2018

(86) PCT No.: PCT/CN2018/087916
§ 371 (c)(1),
(2) Date: Jun. 29, 2020

(87) PCT Pub. No.: WO2019/128055
PCT Pub. Date: Jul. 4, 2019

(65) Prior Publication Data
US 2020/0326739 A1    Oct. 15, 2020

(30) Foreign Application Priority Data

Dec. 29, 2017 (CN) .......................... 2017 1 1483345

(51) Int. Cl.
*G05F 1/56* (2006.01)
*G06F 1/3296* (2019.01)
(Continued)

(52) U.S. Cl.
CPC .............. *G05F 1/56* (2013.01); *G06F 1/3296* (2013.01); *H02M 3/158* (2013.01);
(Continued)

(58) Field of Classification Search
CPC ... G05F 1/10; G05F 1/267; G05F 1/46; G05F 1/561; G05F 1/567; G05F 1/569;
(Continued)

(56) References Cited

U.S. PATENT DOCUMENTS 7,466,115 B2   12/2008   Biagi
9,489,037 B2   11/2016   Heo et al.
(Continued)

FOREIGN PATENT DOCUMENTS

CN    101568893 A    10/2009
CN    103186157 A    7/2013
(Continued)

OTHER PUBLICATIONS

International Search Report and the English Translation of the International Search Report as cited in the international application No. PCT/CN2018/087916, dated Sep. 27, 2018, 6 pages.
(Continued)

*Primary Examiner* — Bryan R Perez
(74) *Attorney, Agent, or Firm* — Cooper Legal Group, LLC

(57) ABSTRACT

An ultra-low power consumption power supply structure, comprising: a first LDO circuit, a second LDO circuit, a first
(Continued)

Bandgap module, a second Bandgap module and a switching circuit, wherein the first LDO circuit is used for providing an LDO output voltage when an SOC chip is in a normal operating mode, and the second LDO circuit is used for providing an LDO output voltage when the SOC chip is in an ultra-low power consumption mode; the first Bandgap module is used for providing, based on a main power supply voltage, a first reference voltage for the first LDO circuit at the time of power-on startup, and the second Bandgap module is used for providing a second reference voltage for the second LDO circuit after power-on startup is completed; and the switching circuit is used for switching the mode in which the first reference voltage is output by the first Bandgap module at the time of power-on startup to the mode in which the second reference voltage is output by the second Bandgap module after power-on startup is completed.

7 Claims, 1 Drawing Sheet

(51) Int. Cl.
*H02M 3/158* (2006.01)
*H02M 3/335* (2006.01)
*G05F 1/575* (2006.01)
*H02M 1/00* (2006.01)

(52) U.S. Cl.
CPC ......... *H02M 3/33561* (2013.01); *G05F 1/575* (2013.01); *H02M 2001/0045* (2013.01)

(58) Field of Classification Search
CPC ........ G05F 1/571; G05F 1/573; G05F 1/5735; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/08; G05F 1/153; G05F 1/16; G05F 1/26; G05F 1/34
See application file for complete search history.

(56) References Cited

U.S. PATENT DOCUMENTS

| 2007/0063736 | A1 | 3/2007 | Biagi | |
| 2013/0169246 | A1 | 7/2013 | Shao | |
| 2015/0015224 | A1 | 1/2015 | Yasusaka | |
| 2015/0234452 | A1 | 8/2015 | Heo et al. | |
| 2016/0026199 | A1* | 1/2016 | El-Nozahi | G05F 1/573 323/274 |

FOREIGN PATENT DOCUMENTS

| CN | 105549673 A | 5/2016 |
| JP | H07287620 A | 10/1995 |

OTHER PUBLICATIONS

Written Opinion and English translation of the Written Opinion of the International Searching Authority as cited in the international application No. PCT/CN2018/087916, dated Sep. 27, 2018, 6 pages.

* cited by examiner

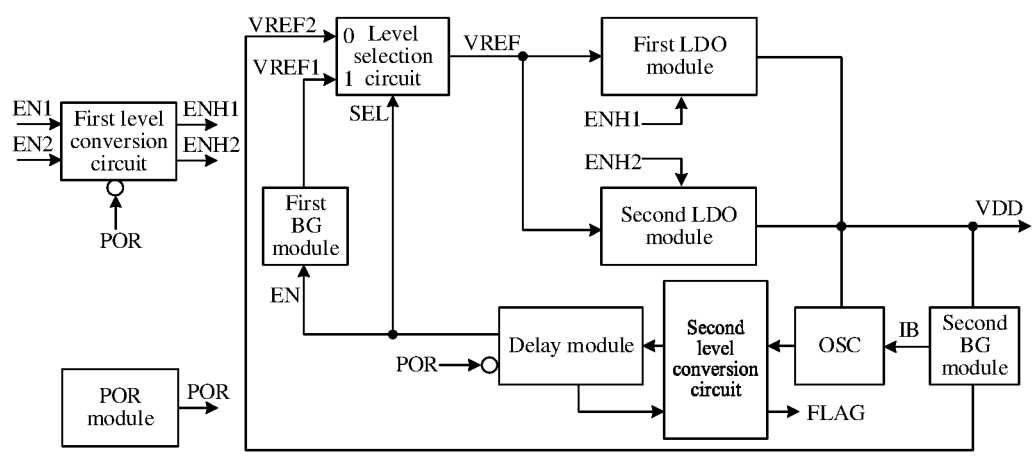

ULTRA-LOW POWER CONSUMPTION POWER SUPPLY STRUCTURE

CROSS-REFERENCE TO RELATED APPLICATION

This application claims priority to Chinese patent application No. 201711483345.7 filed on Dec. 29, 2017, the disclosure of which is hereby incorporated by reference in its entirety.

TECHNICAL FIELD

The disclosure belongs to the field of chip technology, and relates to an ultra-low power consumption power supply structure.

BACKGROUND

Most system on chip (SOC) chips usually have a variety of operating modes, such as a normal operating mode, a low power consumption mode, and the like. Power consumption requirements of the chip are different in different operating modes. A power supply module is configured to convert a main power supply voltage to an internal core voltage, and provide a power supply for an internal circuit. A working current of the power supply module is generally in a microampere (μA) level. When the chip is in the normal operating mode, the power supply module may provide large current drive. At this time, since the power consumption of a digital circuit itself is in a milliampere (mA) level, the current consumed by the power supply module may be ignored. However, when the chip is in the low power consumption operating mode, since a digital clock is turned off or operates at a lower clock frequency, the power consumption of the digital circuit is also smaller, the ratio of the current consumed by the power supply module that cannot be turned off is greatly increased in the low power consumption mode, and the current also determines a current level of the SOC chip in the low power consumption mode. In order to realize the purpose that the current of the SOC chip in the low power consumption mode is in an order of 1 to 2 μA, the power consumption of the power supply module must be in an nA level. Therefore, the power supply module needs to determine the normal operating mode and the ultra-low power consumption operating mode of the SOC chip. An important index of the power supply module is a power supply rejection ratio (PSRR). In the ultra-low power consumption mode, the jitter of the power supply may easily cause the jitter of circuit output, such that the PSRR performance is very poor.

Generally, the power supply module at least includes a low dropout regulator (LDO) and a bandgap voltage reference (bandgap) for providing a reference voltage for the LDO. In order to achieve dual-mode switching, in a related art, an LDO circuit including two LDO circuits is provided, and the magnitude of the current bias is controlled by a control signal to achieve the switching of two modes. However, this manner does not involve how to improve the PSRR performance. In terms of improving the PSRR performance of the power supply module, the most common method is to optimize the power supply rejection capability of the LDO and the bandgap circuit. Methods for improving the PSRR of the LDO and the bandgap circuit include improving an internal node slew rate, built-in high-pass filtering, power supply ripple preprocessing, and the like.

On the premise of low power consumption, the PSRR of the bandgap circuit which provides the reference voltage for the LDO is the cause of the poor PSRR of the entire power supply system, therefore, the PSRR performance of the bandgap circuit directly affects the PSRR performance of the power supply system. At present, a pre-regulation technology, a compensation technology, and the like are adopted in a method for improving the PSRR of the bandgap circuit, and it is necessary to add a new current path into the traditional bandgap circuit, which is not conducive to low power consumption design. Furthermore, when the working current of the power supply module is limited at the nA level, the effect of improving the PSRR of the bandgap circuit is poor.

The information disclosed in the background is only intended to increase the understanding of the overall background of the disclosure, and should not be taken as an acknowledgement or in any way suggesting that this information constitutes the related art that is well known to those skilled in the art.

SUMMARY

The embodiments of the disclosure are expected to provide an ultra-low power consumption power supply structure, so as to achieve high PSRR performance in an ultra-low power consumption mode by adopting a new power supply structure, and realize compatibility between a normal operating mode of large drive and a low power consumption mode.

In order to realize the above objectives, an embodiment of the disclosure provides an ultra-low power consumption power supply structure, which includes a first LDO circuit, a second LDO circuit, a first bandgap module, a second bandgap module and a switching circuit. The first LDO circuit may be configured to provide an LDO output voltage in response to an SOC chip being in a normal operating mode, and provide an output current for the SOC chip; the second LDO circuit may be configured to provide an LDO output voltage in response to the SOC chip being in an ultra-low power consumption mode, and provide an output current for the SOC chip; and the output current of the second LDO circuit may be less than the output current of the first LDO circuit. The first bandgap module may be configured to provide a first reference voltage for the first LDO circuit based on a main power supply voltage during power-on startup; the second bandgap module may be configured to provide a second reference voltage for the second LDO circuit after the power-on startup; and the switching circuit may be configured to switch a mode in which the first bandgap module outputs the first reference voltage during the power-on startup to a mode in which the second bandgap module outputs the second reference voltage after the power-on startup.

In an embodiment, the switching circuit may include a power on reset (POR) circuit, a delay circuit and a level selection circuit. The POR circuit may include a POR module, the delay circuit may include a delay module, the POR module may be coupled to the delay module, and the delay module may be coupled to the level selection circuit; and the POR module may be configured to generate and send a reset signal to the delay module, the delay module may be configured to control the level selection circuit, and the level selection circuit may be configured to select the first reference voltage or the second reference voltage provided for the first LDO circuit and the second LDO circuit.

In an embodiment, the switching circuit may further include an oscillator circuit and a first level conversion circuit. The oscillator circuit may include an oscillator (OSC), and the OSC may be configured to output a clock signal; and the first level conversion circuit may include three signal input ends: an EN1 signal input end, an EN2 signal input end and a POR signal input end, and include two signal output ends: an ENH1 signal output end and an ENH2 signal output end.

In an embodiment, the first LDO circuit may include a first LDO module, and the second LDO circuit may include a second LDO module. The EN1 signal input end and the EN2 signal input end may be respectively configured to input an EN1 control signal and an EN2 control signal sent by the SOC chip; the POR signal input end may be configured to input the POR reset signal; the ENH1 signal output end and the ENH2 signal output end may be respectively configured to output an ENH1 control signal and an ENH2 control signal, and the ENH1 control signal and the ENH2 control signal may be configured to respectively control the first LDO module of the first LDO circuit and the second LDO module of the second LDO circuit to be turned on or turned off.

In an embodiment, the OSC may be configured to provide a clock signal for the delay module through control of the POR reset signal generated by the POR module during the power-on startup; the delay module may be configured to control the level selection circuit based on the clock signal; and the level selection circuit may be configured to enable the first bandgap module to be turned on and select the first reference voltage provided for the first LDO circuit; and the first level conversion circuit may be configured to enable the first LDO module to be turned on and enable the second LDO module to be turned off through the control of the POR reset signal.

In an embodiment, the second bandgap module may be started during power-on, the LDO output voltage may be configured to provide a power supply for the OSC, and the second bandgap module may be configured to provide a bias current; and the OSC may be configured to output a clock signal to the delay module, the POR reset signal may be released; after an OSC clock delay is accumulated to a preset duration, the level selection circuit may be configured to turn off the first bandgap module and select the second reference voltage provided for the first LDO circuit and the second LDO circuit.

In an embodiment, after the power-on startup, in response to the SOC chip being in a low power consumption mode, the first level conversion circuit may be configured to terminate the EN1 control signal and start the EN2 control signal, and to control the first LDO module to be turned off and control the second LDO module to be turned on, such that the SOC chip may be powered through the second bandgap module and the second LDO circuit.

In an embodiment, the POR module may be configured to be turned off through control of the SOC chip after the power-on startup; and the OSC may be configured to be turned off through the control of the SOC chip after the power-on startup.

The embodiments of the disclosure have the following beneficial effects.

1. The structural design is simple, the PSRR performance is optimized structurally, and each sub-module of the power supply structure according to the embodiments of the disclosure may adopt a traditional structure and does not require a special design to improve the PSRR performance.

2. The sub-modules do not need to add circuits to improve the PSRR performance, and in an ultra-low power consumption mode, only the low-power consumption second LDO module and the low-power consumption second bandgap module nested below the second LDO module consume currents, such that the power consumption of the system is greatly reduced, and a low-power consumption target value is very easy to realize.

3. The power supply structure has good robustness. The power supply structure may be reset by using the POR reset signal when being started, thereby ensuring that the first LDO module can be successfully started. Since the oscillator for switching delay is powered by the LDO output voltage, the second bandgap module behind the first LDO circuit provides a current. Therefore, the magnitude of the oscillation frequency directly reflects the power-on of the first LDO circuit and the establishment condition of the second bandgap module, and adaptive results of switching time of the second bandgap module and the power-on speed of the first LDO circuit and the establishment speed of the second bandgap module are generated, so as to improve the starting robustness of the power supply structure. At the same time, since the second bandgap module is positioned behind the second LDO circuit during working, the second bandgap module and the second LDO circuit form a loop which is not easily affected by the power supply. Therefore, the power supply structure has good robustness.

4. The power supply structure includes a switching circuit which performs timed switching through the oscillator controlled by the LDO output voltage and the output current of the second bandgap module.

BRIEF DESCRIPTION OF THE DRAWINGS

FIG. 1 is a schematic diagram of an ultra-low power consumption power supply structure according to an embodiment of the disclosure.

DETAILED DESCRIPTION

The specific implementation manners of the disclosure are described in detail below with reference to the drawings, but it should be understood that the scope of protection of the disclosure is not limited by the specific implementation manners.

Unless otherwise expressly stated, throughout the specification and claims, the term "including" or variations thereof such as "containing" or "involving" will be understood to include the stated elements or components, but not to exclude other elements or components.

As illustrated in FIG. 1, an ultra-low power consumption power supply structure according to a specific implementation manner of the disclosure includes a first LDO circuit, a second LDO circuit, a first bandgap module (a first BG module for short in FIG. 1), a second bandgap module (a second BG module for short in FIG. 1), and a switching circuit. The switching circuit includes a POR circuit, an oscillator circuit, a delay circuit and a level conversion circuit. The switching circuit is configured to switch a mode in which the first bandgap module outputs a first reference voltage (VREF1 in FIG. 1) during power-on startup to a mode in which the second bandgap module outputs a second reference voltage (VREF2 in FIG. 1) after the power-on startup (is completed). The first LDO circuit is configured to provide an LDO output voltage when an SOC chip is in a normal operating mode, and provide an output current for the SOC chip. The second LDO circuit is configured to provide an LDO output voltage when the SOC chip is in an ultra-low power consumption mode, and provide an output current for the SOC chip. The output current of the second LDO circuit is less than the output current of the first LDO circuit. Since the second LDO circuit is an ultra-low power consumption LDO with a very small working current, the maximum driving current value is also smaller, but can meet driving current demands of the SOC chip in a low power consumption mode. The first bandgap module works at a main power supply voltage, and is configured to provide the first reference voltage for the first LDO circuit during the power-on startup. Enabling of the first bandgap module is controlled by a delay module. The second bandgap module is a reference source working at an LDO output voltage VDD (that is, a voltage VDD which is output by the LDO circuit), and is configured to provide the second reference voltage for the second LDO circuit after the power-on startup.

The switching circuit further includes a level selection circuit. The POR circuit includes a POR module. The delay circuit includes a delay module, the POR module is coupled to the delay module, and the delay module is coupled to the level selection circuit. The POR module generates and sends a POR reset signal to the delay module, the delay module controls the level selection circuit, and the level selection circuit is configured to select the first reference voltage or the second reference voltage provided for the first LDO circuit and the second LDO circuit.

The POR module controls the delay module as well as a first LDO module and a second LDO module during the power-on startup, and the level conversion circuit is in a stationary state. The delay module works at the main power supply voltage and controls the first bandgap module to be turned on during a resetting stage of the POR module, and the level selection circuit selects the first bandgap module. After the resetting of POR, by virtue of output of clock timing through an OSC for a preset duration, the first bandgap module is turned off, and the level selection circuit selects the second bandgap module and simultaneously outputs a power switching FLAG signal. Under control of the delay module, the level selection circuit selects the reference voltage of the first LDO circuit and the second LDO circuit from the first bandgap module during the power-on startup, and selects the reference voltage of the first LDO circuit and the second LDO circuit from the second bandgap module after the power-on startup. The OSC may output a clock signal, and a second level conversion circuit is further coupled to the OSC circuit and the delay circuit. The first level conversion circuit includes three signal input ends: an EN1 signal input end, an EN2 signal input end and a POR signal input end, and includes two signal output ends: an ENH1 signal output end and an ENH2 signal output end. The EN1 signal input end and the EN2 signal input end are respectively configured to input an EN1 control signal and an EN2 control signal sent by the SOC chip, and the POR signal input end is configured to input the POR reset signal. The ENH1 signal output end and the ENH2 signal output end are respectively configured to output an ENH1 signal and an ENH2 signal, and the ENH1 signal and the ENH2 signal respectively control the first LDO module of the first LDO circuit and the second LDO module of the second LDO circuit to be turned on or turned off.

The power-on processes of the power supply structure according to the embodiments of the disclosure are as follows.

when the power supply structure is in the power-on startup, the POR module generates a POR reset signal, the OSC provides a clock signal for the delay module through control of the POR reset signal, the delay module controls the level selection circuit to enable the first bandgap module to be turned on, and provides the first reference voltage for the first LDO circuit and the second LDO circuit. The first level conversion circuit turns on the first LDO module and turns off the second LDO module under the control of the POR reset signal, so as to guarantee that the first LDO circuit may provide larger current output during the power-on startup.

When the power supply structure is in the power-on process, that is, when the LDO output voltage VDD rises to a certain level, the second bandgap module is started and starts to output the second reference voltage and a bias current. The LDO output voltage VDD provides a power supply for the OSC, and the second bandgap module provides the bias current. When the LDO output voltage VDD is higher than a starting voltage of the OSC and the OSC receives the bias current from the second bandgap module, the OSC outputs a clock signal and converts the clock signal to a clock signal at the main power supply voltage so as to send it to the delay module. When the main power supply rises high enough, the POR reset signal is released. After the POR reset signal is released and an OSC clock delay is accumulated to a preset duration, the delay module may be determined that the second bandgap module is established stably, such that the first bandgap module is turned off, the second reference voltage is selected as the reference voltage of the first LDO circuit and the second LDO circuit, and an identification signal for switching completion of the bandgap module is given and is converted to a FLAG signal under a VDD domain through the level conversion circuit so as to be used in a digital circuit. Although the POR module and the OSC are required for participating in the power-on process, the two modules are indispensable modules for most SOC chips. Therefore, no additional circuit overhead is added.

After the power supply structure completes the power-on startup, the corresponding EN1 control signal and EN2 control signal may be given through the SOC chip so as to control the LDO module. After the resetting of the POR module is completed, the EN1 control signal and the EN2 control signal is configured to control the first LDO module and the second LDO module to be turned on or turned off. If the SOC chip enters a low power consumption mode, the EN1 control signal needs to be terminated, and the EN2 control signal needs to be started, such that the SOC chip is powered through the second bandgap module of ultra-low power consumption and second LDO circuit. After the power supply structure completes the power-on startup, the POR module and the OSC may be set to be in a turned-off state according to requirements through control of the SOC chip. When the POR module and the OSC are set to be in the turned-off state, the overall power consumption is very low. Since the second bandgap module is nested below the second LDO circuit, the PSRR performance of the system is better. The circuit design of the two sub-modules does not require additional current overhead for high PSRR design, and the second LDO circuit does not need to provide a large driving current, therefore, the circuit design is easy to achieve extremely low power consumption.

When the ultra-low power consumption power supply structure according to the embodiments of the disclosure is powered on with different power supplies, the POR module may guarantee that an internal control circuit is in a stationary state that a high-voltage first bandgap module and a large-power consumption first LDO circuit are turned on during the power-on. Only when the LDO output voltage reaches a sufficiently high level and the second bandgap module starts to work, a corresponding power voltage and a corresponding working current may be provided for the OSC. Therefore, the oscillation frequency of the OSC reflects the level of the LDO output voltage, and the delay time for switching the first reference voltage and the second reference voltage is also related to the voltage level established by the LDO circuit. When the main power supply is powered on slowly and the LDO output voltage also rises slowly following the power supply voltage, during the establishment, the frequency of the OSC is slower due to a lower power supply voltage, and the delay time also increases, such that the switching time of the first reference voltage and the second reference voltage is delayed, the reference voltage may only be switched to the internal second bandgap module when the LDO output voltage is also higher. Therefore, adaptive results of the switching time of the bandgap module and the power-on speed of the power supply are generated so as to improve the stability of the power supply system in response to different power-on conditions of the power supply.

The above descriptions of exemplary embodiments of the disclosure are for purposes of explanation and illustration. These descriptions are not intended to limit the disclosure to the precise form disclosed, and it is clear that many changes and modifications may be made in accordance with the above teachings. The purpose of selecting and describing the exemplary embodiments is to explain the specific principles of the disclosure and its practical applications, such that those skilled in the art may implement and utilize various exemplary embodiments of the disclosure and various options and changes. The scope of the disclosure is intended to be defined by the claims and equivalent forms thereof.

The invention claimed is:

1. An ultra-low power consumption power supply structure, comprising: a first low dropout regulator (LDO) circuit, a second LDO circuit, a first bandgap module, a second bandgap module and a switching circuit;
    wherein the first LDO circuit is configured to provide an LDO output voltage in response to a system on chip (SOC) chip being in a normal operating mode, and provide an output current for the SOC chip; the second LDO circuit is configured to provide an LDO output voltage in response to the SOC chip being in an ultra-low power consumption mode, and provide an output current for the SOC chip; and the output current of the second LDO circuit is less than the output current of the first LDO circuit;
    wherein the first bandgap module is configured to provide a first reference voltage for the first LDO circuit during power-on startup; and the second bandgap module is configured to provide a second reference voltage for the second LDO circuit after the power-on startup; and
    wherein the switching circuit is configured to switch a mode in which the first bandgap module outputs the first reference voltage during the power-on startup to a mode in which the second bandgap module outputs the second reference voltage after the power-on startup;
    wherein the switching circuit comprises a power on reset (POR) circuit, a delay circuit and a level selection circuit;
    wherein the POR circuit comprises a POR module, the delay circuit comprises a delay module, the POR module is coupled to the delay module, and the delay module is coupled to the level selection circuit; and
    wherein the POR module is configured to generate and send a POR reset signal to the delay module, the delay module is configured to control the level selection circuit, and the level selection circuit is configured to select the first reference voltage or the second reference voltage provided for the first LDO circuit and the second LDO circuit.

2. The ultra-low power consumption power supply structure of claim 1, wherein the switching circuit further comprises an oscillator circuit and a first level conversion circuit; wherein the oscillator circuit comprises an oscillator (OSC), and the OSC is configured to output a clock signal; and the first level conversion circuit comprises three signal input ends: an EN1 signal input end, an EN2 signal input end and a POR signal input end, and comprises two signal output ends: an ENH1 signal output end and an ENH2 signal output end.

3. The ultra-low power consumption power supply structure of claim 2, wherein the first LDO circuit comprises a first LDO module, and the second LDO circuit comprises a second LDO module;
    wherein the EN1 signal input end and the EN2 signal input end are respectively configured to input an EN1 control signal and an EN2 control signal sent by the SOC chip; the POR signal input end is configured to input the POR reset signal; the ENH1 signal output end and the ENH2 signal output end are respectively configured to output an ENH1 control signal and an ENH2 control signal, and the ENH1 control signal and the ENH2 control signal are configured to respectively control the first LDO module and the second LDO module to be turned on or turned off.

4. The ultra-low power consumption power supply structure of claim 2, wherein the OSC is configured to provide a clock signal for the delay module through control of the POR reset signal generated by the POR module during the power-on startup; the delay module is configured to control the level selection circuit based on the clock signal; and the level selection circuit is configured to enable the first bandgap module to be turned on and select the first reference voltage provided for the first LDO circuit; and
    wherein the first level conversion circuit is configured to enable the first LDO module to be turned on and enable the second LDO module to be turned off through the control of the POR reset signal.

5. The ultra-low power consumption power supply structure of claim 2, wherein the second bandgap module is started during power-on, the LDO output voltage is configured to provide a power supply for the OSC, and the second bandgap module is configured to provide a bias current; and
    wherein the OSC is configured to output a clock signal to the delay module, the POR reset signal is released; after an OSC clock delay is accumulated to a preset duration, the level selection circuit is configured to turn off the first bandgap module and select the second reference voltage provided for the first LDO circuit and the second LDO circuit.

6. The ultra-low power consumption power supply structure of claim 3, wherein after the power-on startup, in response to the SOC chip being in a low power consumption mode, the first level conversion circuit is configured to terminate the EN1 control signal and start the EN2 control signal, and to control the first LDO module to be turned off and control the second LDO module to be turned on, such that the SOC chip is powered through the second bandgap module and the second LDO circuit.

7. The ultra-low power consumption power supply structure of claim 5, wherein the POR module is configured to be turned off through control of the SOC chip after the power-on startup; and wherein the OSC is configured to be turned off through the control of the SOC chip after the power-on startup.

* * * * *